(12) United States Patent
Stewart

(10) Patent No.: US 11,544,345 B1
(45) Date of Patent: Jan. 3, 2023

(54) APPARATUSES AND METHODS FOR LINKING POSTING DATA

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

(*) Notice: Subject to any disclaimer, the term of this patent is extended or adjusted under 35 U.S.C. 154(b) by 0 days.

(21) Appl. No.: 17/690,424

(22) Filed: Mar. 9, 2022

(51) Int. Cl.
| | | |
|---|---|---|
| G06F 16/957 | (2019.01) | |
| G06Q 10/10 | (2012.01) | |
| G10L 15/26 | (2006.01) | |
| G06F 40/40 | (2020.01) | |
| G06N 5/04 | (2006.01) | |

(52) U.S. Cl.
CPC .......... G06F 16/9574 (2019.01); G06F 40/40 (2020.01); G06N 5/048 (2013.01); G06Q 10/1053 (2013.01); G10L 15/26 (2013.01)

(58) Field of Classification Search
CPC .... G06F 16/9574; G06F 40/40; G06F 40/131; G06N 5/048; G06Q 10/1053; G10L 15/26
See application file for complete search history.

(56) References Cited

U.S. PATENT DOCUMENTS

| | | | |
|---|---|---|---|
| 6,718,340 B1 * | 4/2004 | Hartman | G06F 16/93 |
| | | | 707/999.102 |
| 8,645,284 B2 | 2/2014 | Nanda et al. | |
| 10,657,498 B2 * | 5/2020 | Dey | G06F 40/279 |
| 10,803,421 B1 | 10/2020 | Garg et al. | |
| 2013/0290209 A1 * | 10/2013 | Wirz | G06Q 10/1053 |
| | | | 705/321 |
| 2016/0004488 A1 * | 1/2016 | Hirose | H04N 1/00127 |
| | | | 358/1.15 |
| 2016/0379170 A1 * | 12/2016 | Pande | G06Q 10/1053 |
| | | | 705/321 |
| 2017/0255906 A1 | 9/2017 | Le et al. | |
| 2018/0012188 A1 * | 1/2018 | Kramer | G06Q 10/06398 |

(Continued)

FOREIGN PATENT DOCUMENTS

| | | |
|---|---|---|
| EP | 2908278 A1 | 8/2015 |
| WO | 2016076790 | 5/2016 |

OTHER PUBLICATIONS

Evanthia Faliagka, Lazaros Iliadis, Ioannis Karydis, Maria Rigou, Spyros Sioutas, Athanasios Tsakalidis & Giannis Tzimas , On-line Consistent Ranking on E-recruitment; Seeking the truth behind a well-formed CV, Jul. 11, 2013.

*Primary Examiner* — Michael Colucci
(74) *Attorney, Agent, or Firm* — Caldwell Intellectual Property Law

(57) ABSTRACT

Aspects relate to apparatuses and methods for linking posting data to a plurality of user identifiers. An exemplary apparatus includes a processor and a memory communicatively connected to the processor, the memory containing instructions configuring the processor to receive a plurality of user identifiers relating to a plurality of users, receive posting data from a posting generator of a plurality of posting generators, identify a plurality of keywords within the posting data, generate a keyword ranking, match a plurality of keywords of the keyword ranking to the plurality of user identifiers, and generate, as a function of the matching, a ranking of the plurality of user identifiers based on a superiority criterion of each user identifier using a fuzzy set inference system.

18 Claims, 7 Drawing Sheets

(56) References Cited

U.S. PATENT DOCUMENTS

| | | |
|---|---|---|
| 2018/0096307 A1* | 4/2018 | Fortier .................. G06N 5/022 |
| 2019/0102704 A1 | 4/2019 | Liu |
| 2019/0303877 A1* | 10/2019 | McCann ............ G06Q 10/1053 |
| 2019/0385469 A1 | 12/2019 | Gordon et al. |
| 2020/0210958 A1 | 7/2020 | Rotaru et al. |
| 2020/0311163 A1 | 10/2020 | Ma et al. |
| 2021/0089570 A1 | 3/2021 | Hunter et al. |
| 2021/0224751 A1* | 7/2021 | Nagalingam ......... G06F 40/131 |
| 2021/0312399 A1* | 10/2021 | Asokan .................. G10L 25/63 |

* cited by examiner

APPARATUSES AND METHODS FOR LINKING POSTING DATA

FIELD OF THE INVENTION

The present invention generally relates to the field of search engines. In particular, the present invention is directed to apparatuses and methods for linking posting data to a plurality of user identifiers.

BACKGROUND

Video content (including short-form video content) has steadily been rising in popularity for many years. Its advantages as a communication medium are manifest. Search engines have become an everyday necessity over the years. Its advantages as a database and research tool are manifest. However, present ways of utilizing search engines to match and rank document content are not capable of optimizing the best match results.

SUMMARY OF THE DISCLOSURE

In an aspect, an apparatus for linking posting data to a plurality of user identifiers is illustrated. The apparatus including at least a processor and a memory communicatively connected to the processor, the memory containing instructions configuring the processor to receive a plurality of user identifiers relating to a plurality of users, receive posting data from a posting generator of a plurality of posting generators, identify a plurality of keywords within the posting data, generate a keyword ranking, match a plurality of keywords of the keyword ranking to the plurality of user identifiers, and generate, as a function of the matching, a ranking of the plurality of user identifiers based on a superiority criterion of each user identifier using a fuzzy set inference system.

In another aspect, a method for linking posting data to a plurality of user identifiers is illustrated. The method includes using a computing device configured to receive a plurality of user identifiers relating to a plurality of users, receive posting data from a posting generator of a plurality of posting generators, identify a plurality of keywords within the posting data, generate a keyword ranking, match a plurality of keywords of the keyword ranking to the plurality of user identifiers, and generate, as a function of the matching, a ranking of the plurality of user identifiers based on a superiority criterion of each user identifier using a fuzzy set inference system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for linking posting data to a plurality of user identifiers.

Aspects of the present disclosure can be used by hiring entities seeking potential job candidates by matching and ranking a plurality of job-seeker profiles to a job listing. Aspects of the present disclosure can also be used to add appeal to a job listing websites by allowing a hiring entity to prioritize certain hiring requirement to find better matching job candidates.

Exemplary embodiments illustrating aspects of the present disclosure are described below in the context of several specific examples.

Figure 1:
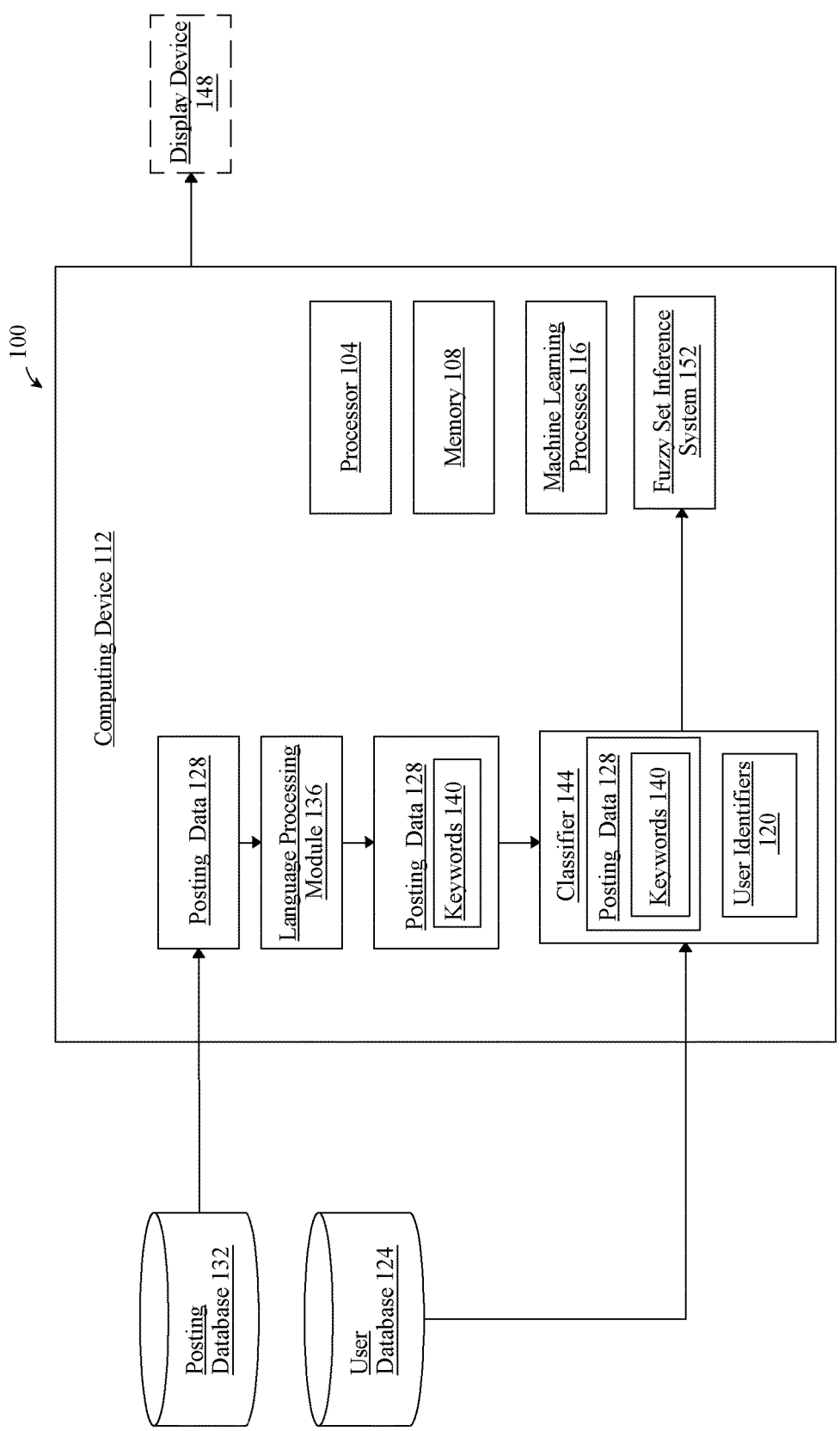
FIG. 1 is a block diagram of an embodiment of an apparatus for linking posting data to a plurality of user identifiers.

Referring now to FIG. 1, an exemplary embodiment of an apparatus 100 for linking posting data to a plurality of user identifiers is illustrated. Apparatus 100 includes a processor 104 and a memory 108 communicatively connected to processor 104, wherein memory 108 contains instructions configuring processor 104 to carry out the linking process. Processor 104 and memory 108 is contained in a computing device 112. As used in this disclosure, "communicatively connected" means connected by way of a connection, attachment, or linkage between two or more relate which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A computing device 112 may include any computing device as described in this disclosure, including without limitation a microcontroller, microprocessor, digital signal processor (DSP) and/or system on a chip (SoC) as described in this disclosure. Computing device 112 may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of apparatus 100 and/or computing device 112.

With continued reference to FIG. 1, processor 104 and/or computing device 112 may be designed and/or configured by memory 108 to perform any method, method step, or sequence of method steps in any embodiment described in this disclosure, in any order and with any degree of repetition. For instance, processor 104 and/or computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Processor 104 and/or computing device 112 may perform determinations, classification, and/or analysis steps, methods, processes, or the like as described in this disclosure using machine learning processes 116. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process 116 may utilize supervised, unsupervised, lazy-learning processes and/or neural networks, described further below.

Still referring to FIG. 1, processor 104 and/or computing device 112 is configured to receive a plurality of user identifiers 120 relating to a plurality of users, wherein a user identifier 120 of the plurality of user identifiers 120 includes at least a video resume. A "user identifier", as used in this disclosure is information representing a user, including the user's name, contact information, resume, video resume, Curriculum Vitae, previous work history, cover letter, profile photo, a list of relevant skills, certifications, and the like. "As used in this disclosure, a "user" is a person, for example a jobseeker. User identifier is received by processor 104 and/or computing device 112 in at least the form of a video resume. A "video resume" is an item of digital media in visual and/or audio form to provide a recording promoting a user. In some cases, the video resume may include content that is representative or communicative of at least an attribute of the user. Attributes may include information representing a user such as skills, competencies, experience, credentials, talents, and the like. The user may be represented directly by the video resume. For example, in some cases, an image component may represent a visual of the user. As used in this disclosure, an "image component" may be a visual representation of information, such as a plurality of temporally sequential frames and/or pictures, related to the video resume. For example, an image component may include animations, still imagery, recorded video, and the like. In some embodiments, the video resume may be an uploaded to a user database 124 by a user computing device operated by a user that is communicatively connected to processor 104 and/or computing device 112 through a network. As non-limiting examples, the user computing device may be a smartphone, tablet, laptop, pc, and the like.

With continued reference to FIG. 1, a "user database" is a resource storage system used to collect and store any information received from a user, such as videos, images, documents, and the like. User database 124 may be implemented, without limitation, as a relational database, a key-value retrieval database such as a NOSQL database, or any other format or structure for use as a database that a person skilled in the art would recognize as suitable upon review of the entirety of this disclosure. User database 124 may alternatively or additionally be implemented using a distributed data storage protocol and/or data structure, such as a distributed hash table or the like. User database 124 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some cases, the video resume may include a digital video, which may be communicated by way of digital signals, for example between computing devices which are communicatively connected with at least a network. To optimize speed and/or cost of transmission of the video resume. Video may be compressed according to a video compression coding format (i.e., codec). Exemplary video compression codecs include H.26x codecs, MPEG formats, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Still referring to FIG. 1, the video resume may be representative of subject-specific data. As used in this disclosure, "subject-specific data" is any element of information that is associated with a specific user. Exemplary forms of subject-specific data include an image component, the video resume, non-verbal content, verbal content, audio component, as well as any information derived directly or indirectly from the video resume or any other subject-specific data. For example, subject-specific data could be the physical properties of a user, such as their body posture or facial expression. Subject-specific data could also be audio sensory properties of a user, such as tone of voice or background audio in the video resume. More in-depth examples and descriptions of subject-specific data are illustrated in U.S. patent application Ser. No. 17/582,070, filed on Jan. 24, 2022, and entitled "SYSTEMS AND METHODS FOR PARSING AND COMPARING VIDEO RECORD DUPLICATIONS", the entirety of which is incorporated by reference in this disclosure.

With continued reference to FIG. 1, in some embodiments, an image component may include or otherwise represent verbal content. For instance, written or visual verbal content may be included within an image component. Visual verbal content may include images of written text represented by an image component. For example, visual verbal content may include, without limitation, digitally generated graphics, images of written text (e.g., typewritten, and the like), signage, and the like.

Still referring to FIG. 1, in some embodiments, an image component may include or otherwise represent audible verbal content related to at least an attribute of a user. As used in this disclosure, "audible verbal content" is oral (e.g., spoken) verbal content. In some cases, audible verbal content may be included within the video resume by way of an audio component. As used in this disclosure, an "audio component" is a representation of audio, for example a sound, a speech, and the like. In some cases, verbal content may be related to at least an attribute of subject. Additionally, or alternatively, visual verbal content and audible verbal content may be used as inputs to classifier 144$s$ as described throughout this disclosure.

In some cases, processor 104 and/or computing device 112 may include using audiovisual speech recognition (AVSR) processes to recognize verbal content in the video resume. For example, processor 104 and/or computing device 112 may use image content to aid in recognition of audible verbal content such as viewing a user move their lips to speak on video to process the audio content of the video resume. AVSR may use an image component to aid the overall translation of the audio verbal content of the video resume. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is 'on camera.' Other applicable methods of acquiring verbal content are illustrated in U.S. patent application Ser. No. 17/582,070, filed on Jan. 24, 2022, and entitled "SYSTEMS AND METHODS FOR PARSING AND COMPARING VIDEO RECORD DUPLICATIONS", the entirety of which is incorporated by reference in this disclosure.

Still referring to FIG. 1, processor 104 and/or computing device 112 is configured to receive posting data 128 from a posting generator of a plurality of posting generators. As used in this disclosure, "posting data" is information pertaining to the hiring requirements, job descriptions, preferences, expected salary, relocation considerations, employment timeline, and the like of a posting generator. A "posting generator" is a hiring entity or employer. For example, the posting generator could be a company, job matching service, and the like. In some embodiments, posting data 128 may be stored in a posting database 132 connected to computing device 112 using any network interface described throughout this disclosure. As used in this disclosure, a "posting database" is a database containing a plurality of posting data 128 from numerous or the same posting generator. Posting database 132 may be implemented, without limitation, as a relational database, a key-value retrieval database such as a NOSQL database, or any other format or structure for use as a database that a person skilled in the art would recognize as suitable upon review of the entirety of this disclosure. Posting database 132 may alternatively or additionally be implemented using a distributed data storage protocol and/or data structure, such as a distributed hash table or the like. Posting database 132 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, processor 104 and/or computing device 112 is configured to identify a plurality of keywords 140 within posting data 128. Posting data 128 may be in the form of a document, pdf, HTML, HTM, text file (TXT) and the like. As used in this disclosure, a "keyword" is an element of word or syntax used to identify and/or match elements to each other. Keywords 140 may refer to the descriptive elements of posting data 128 related to a posting generator. In some embodiments, a plurality of keywords 140 may be based on a posting category. A "posting category," as used in this disclosure, is a specific grouping of related information. For example, posting data 128 may be a job listing wherein information is sectioned off under specific headings, such as job description, hiring requirements, geographic location, and the like. In some cases, processor 104 and/or computing device 112 may be configured to recognize at least a keyword in a video resume as a function of visual verbal content. In some cases, recognizing a plurality of keywords 140 in posting data 128 may include a language processing module 136. In some embodiments, keywords 140 may be extracted as the descriptive elements of a plurality of posting categories contained in posting data 128. In some embodiments, samples, and examples of keywords 140 submitted by a hiring entity or apparatus 100 administrator may be use used to train language processing module 136 in identifying keywords 128. For instance, a sample may be a list of synonyms used for common words used by hiring entities and job posting, such as "advocate", "attorney-at-law", "counsel", "counselor", "counselor-at-law", "lawyer", and "legal eagle". These samples and examples may additionally be used to classify keywords 140 to similar keywords contained in the plurality of user identifiers 124, as described further below. Language processing module 136 may include any hardware and/or software module. For example, the module may be used to extract from posting data 128 all information pertaining to "truck driver" of posting data 128. Language processing module 136 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 136 may operate to produce a language processing model. Language processing model may include a program automatically generated by computing device and/or language processing module 136 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module 136 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 136 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 136 may use a corpus of documents to generate associations between language elements in a language processing module 136, and diagnostic engine may then use such associations to analyze words extracted from one or more documents and determine that the one or more documents indicate significance of a category. In an embodiment, language module and/or processor 104 and/or computing device 112 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104 and/or computing device 112. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in some cases, recognizing keywords in posting data 128 and video resume may include using optical character recognition. Optical character recognition or optical character reader (OCR) includes automatic conversion of images of written (e.g., typed, handwritten or printed text) into machine-encoded text. In some cases, recognition of at least a keyword from an image component or text document may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of an image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to an image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifier 144s (e.g., k-nearest neighbors algorithm) may be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. A first pass may try to recognize a character. Each character that is satisfactory is passed to an adaptive classifier 144 as training data. The adaptive classifier 144 then gets a chance to recognize characters more accurately as it further analyzes image components. Since the adaptive classifier 144 may have learned something useful a little too late to recognize characters on the first pass, a second pass is run over the image components. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, processor 104 and/or computing device 112 is configured generate a keyword ranking of posting data 128 based on a plurality of weighted values reflecting priority among the plurality of keywords 140. As used in this disclosure, a "keyword ranking" is the plurality of keywords extracted from posting data ordered in descending level of priority. As used in the disclosure, "priority" is the state of importance of a keyword in order of ranking. Priority may be based on the job fulfillment needs of the posting generator. For example, keywords 140 related to education requirements may be given a higher weighted value than keywords 140 related to hobbies. Generating ranking may include using a machine learning process 116 including a feedback loop to generate the plurality of weighted values based on training data containing at least priority feedback from the plurality of posting generators. As used in this disclosure, a "feedback loop" is the process by which a machine learning module/module/algorithm output is routed back as inputs as part of a chain of cause-and-effect that forms a circuit or loop. This may allow the machine learning system to adjust weighted values for optimized ranking output in the future. "Priority feedback" is samples of positive or negative keyword rankings based on priority. In some embodiments, priority feedback may be contained in posting database 132 or a priority feedback database that a plurality of posting generators can upload positive or negative samples to. In some embodiments, the priority feedback from the plurality of posting generators may be received from the priority feedback database. Priority feedback database may be implemented, without limitation, as a relational database, a key-value retrieval database such as a NOSQL database, or any other format or structure for use as a database that a person skilled in the art would recognize as suitable upon review of the entirety of this disclosure. Priority feedback database may alternatively or additionally be implemented using a distributed data storage protocol and/or data structure, such as a distributed hash table or the like. Priority feedback database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

In some embodiments, as a non-limiting example, processor 104 and/or computing device 112 may be configured to display keyword ranking to a posting generator operated display device 152, the posting generator may then leave feedback on the ranking that is to be submitted to the priority feedback database. A "display device", as used herein is an output device for presentation of information in visual or tactile form. In one or more embodiments, display device 148 may be communicatively connected to computing device 112. Display device 148 may be remote to computing device or integrated into computing device 112. Communication between computing device 112 and display device 148 may be wired or wireless. As used in this disclosure, "feedback" is the transmission of evaluative or corrective information about an action, event, or process to the original or controlling source. In some embodiments, display device 148 may include an LCD display, an OLED display, a CRT display, an LED display, and the like. The posting generator feedback may be as simple as marking the ranking as good or bad or may be detailed guidelines to how each keyword of the plurality of keywords 140 should be weighted. For example, processor 104 and/or computing device 112 may be configured to generate a form for a posting generator to fill out, asking questions such as, "Was this ranking to your satisfaction, if not explain what should be different", "List examples of keywords to be included", and the like. The form may be outputted as an attachment to the keyword ranking. Additionally, feedback may be in the form of manually adjusting the ranking of the keywords. In some embodiments, the posting generator may provide a ranking score. A "ranking score" is a score indicating a level of satisfaction or dissatisfaction with the ranking. As non-limiting examples, the ranking score may be given as a letter grade (i.e. A to F), a percentage, a decimal, a fraction, or a score out of ten. As part of the training data, a machine learning algorithm, which may be a component of machine learning processes 116 may then take the original ranked keyword output as a new input and generate a better keyword ranking based on the priority feedback. This feedback process may used to further train the machine learning system to learn priority patterns among a plurality of posting generators when determining weighted values. As a non-limiting example, the machine learning system may learn that, as a general rule, posting generators prioritize keywords 140 related to work experience over keywords 140 related to education and should be weighted accordingly.

Still referring to FIG. 1, processor 104 and/or computing device 112 is configured to match a plurality of keywords 140 of the keyword ranking to the plurality of user identifiers 120. In some embodiments, matching may include classifying the keywords 140 contained in posting data 128 to similar keywords contained in a video resume. For example, keywords 140 relating "web developer internship experience" may be matched to the plurality of video resumes containing similar keywords, similar keywords may be based on synonyms of keywords 140 as described above. Matching may occur through a classifier 144. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifier 144 may be configured to output at least a datum that labels or otherwise identifies a set of data that are clustered together, found to be close under a distance metric as described below, or the like. Processor 104 and/or computing device 112 and/or another device may generate classifier 144 using a classification algorithm, defined as a processes whereby a processor 104 and/or computing device 112 derives classifier 144 from training data. In an embodiment, training data may include data from User database 124, sample and examples of keywords 140, posting database 132, language processing module 136, and any other training data described throughout this disclosure. Classifier 144 may take the plurality of ranked keywords 140 from posting data 128 and the plurality of user identifiers 120 contained in user database 124 as algorithm inputs. Classifier 144 may then use the training data disclosed above to output data bins of particular user identifiers 120 of the plurality of user identifiers 120 matched to posting data 128. Each data bin may be categorized to each user identifier 120 contained in User database 124 and labeled with the contact information of the user. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifier 144s.

Still referring to FIG. 1, processor 104 and/or computing device 112 may be configured to generate classifier 144 using a Naïve Bayes classification algorithm. Naïve Bayes classification algorithm generates classifier 144s by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 and/or computing device 112 may then calculate a likelihood table by calculating probabilities of different data entries and classification labels. Processor 104 and/or computing device 112 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 and/or computing device 112 may be configured to generate classifier 144 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier 144 to select the k most similar entries training data to a given sample, determining the most common classifier 144 of the entries in a database, and classifying the known sample; this may be performed recursively and/or iteratively to generate classifier 144 that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute $l$ as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, processor 104 and/or computing device 112 is configured to generate, as a function of the matching, a ranking of the plurality of user identifiers 120 using a fuzzy set inference system 152 based on a superiority criterion of each user identifier. In some, embodiments, ranking may be based on the superiority criterion of each user identifier, regarding compatibility to the posting data 128, compared to the plurality of user identifiers 120. For example, "John Smith" may be ranked higher than "Jane Doe" based on a determination that Smith's resume is superior to Doe's based on the high compatibility of Smith's resume to a job posting. In some embodiments, compatibility may be based on the similarity of keywords in user identifier 120 to keywords 140 contained in posting data 128. In some embodiments, compatibly may be based on the total amount of similar keywords contained in user identifier 120. In some embodiments, compatibility may be the quality of keywords found in user identifier 120, for example, Smith's resume may contain keywords that are prioritized higher than the keywords contained in Doe's. Ranking the plurality of user identifiers 120 includes using a fuzzy set inference system 152 as discussed further below. Processor 104 and/or computing device 112 may take the output data of classifier 144 and use it as fuzzy set input wherein the inference system may utilize a superiority criterion to rank each matched user identifier against that the plurality of matched user identifiers 120. In some embodiments, as a function of the user identifier ranking, processor 104 and/or computing device 112 may be configured to send the inference system output to display device 148 operated by the posting generator associated with the posting data 128.

Figure 2:
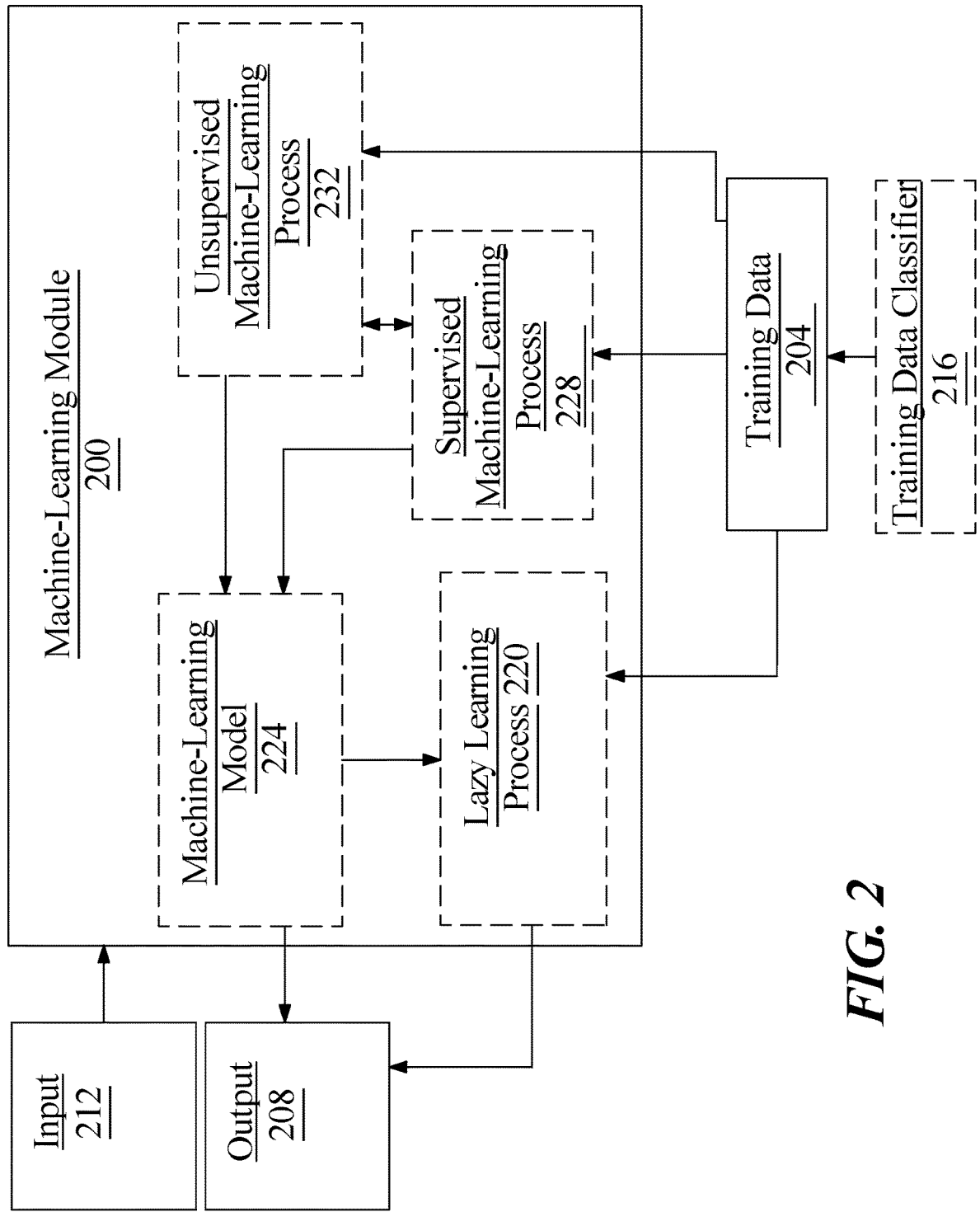
FIG. 2 is a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier generated by a machine learning algorithm known as a "classification algorithm". Machine-learning module 200 may generate a classifier using a classification algorithm, defined as a processes whereby a computing device and/or any module and/or component operating thereon derives a classifier from training data 204.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs and outputs described throughout this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
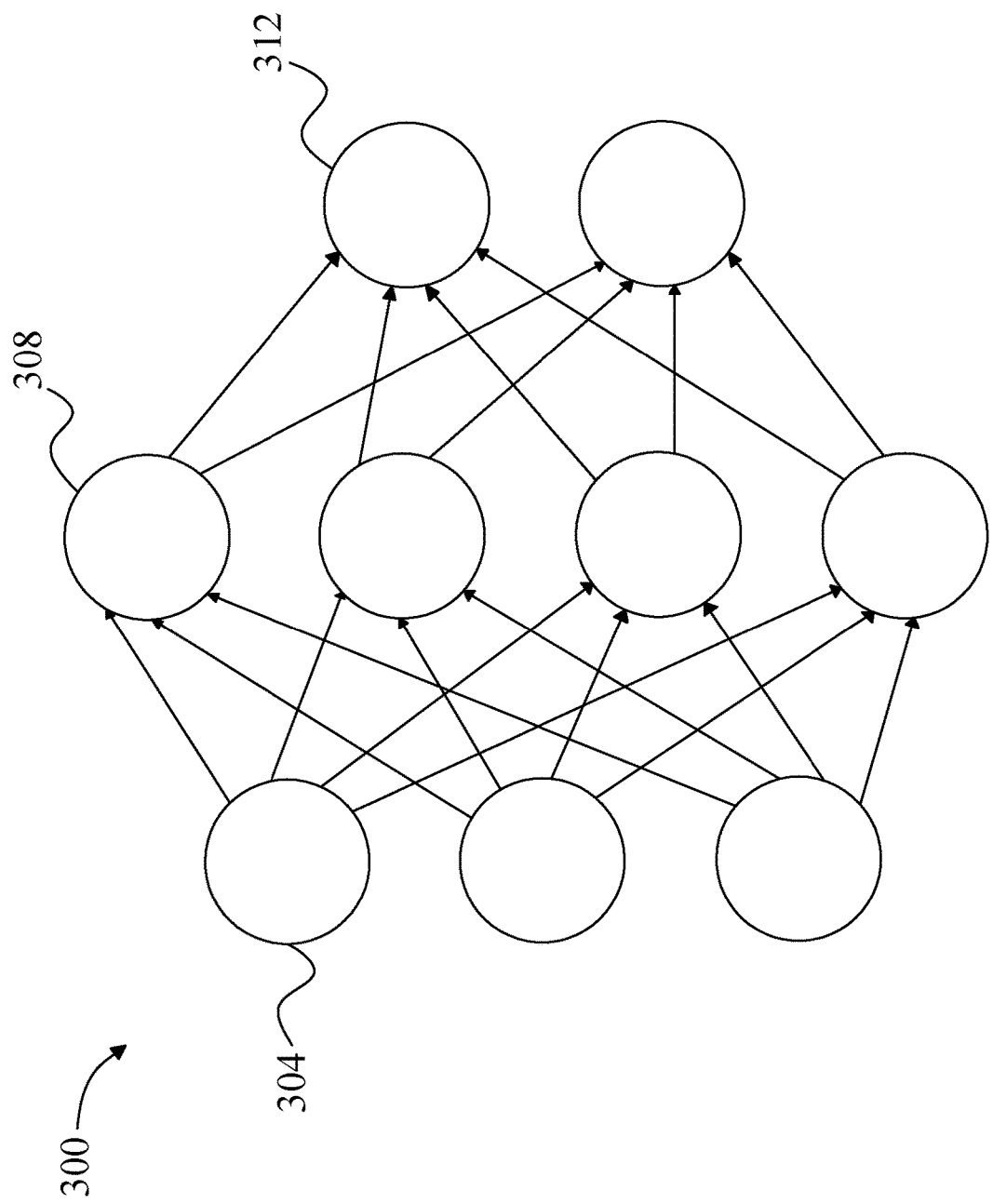
FIG. 3 illustrates an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
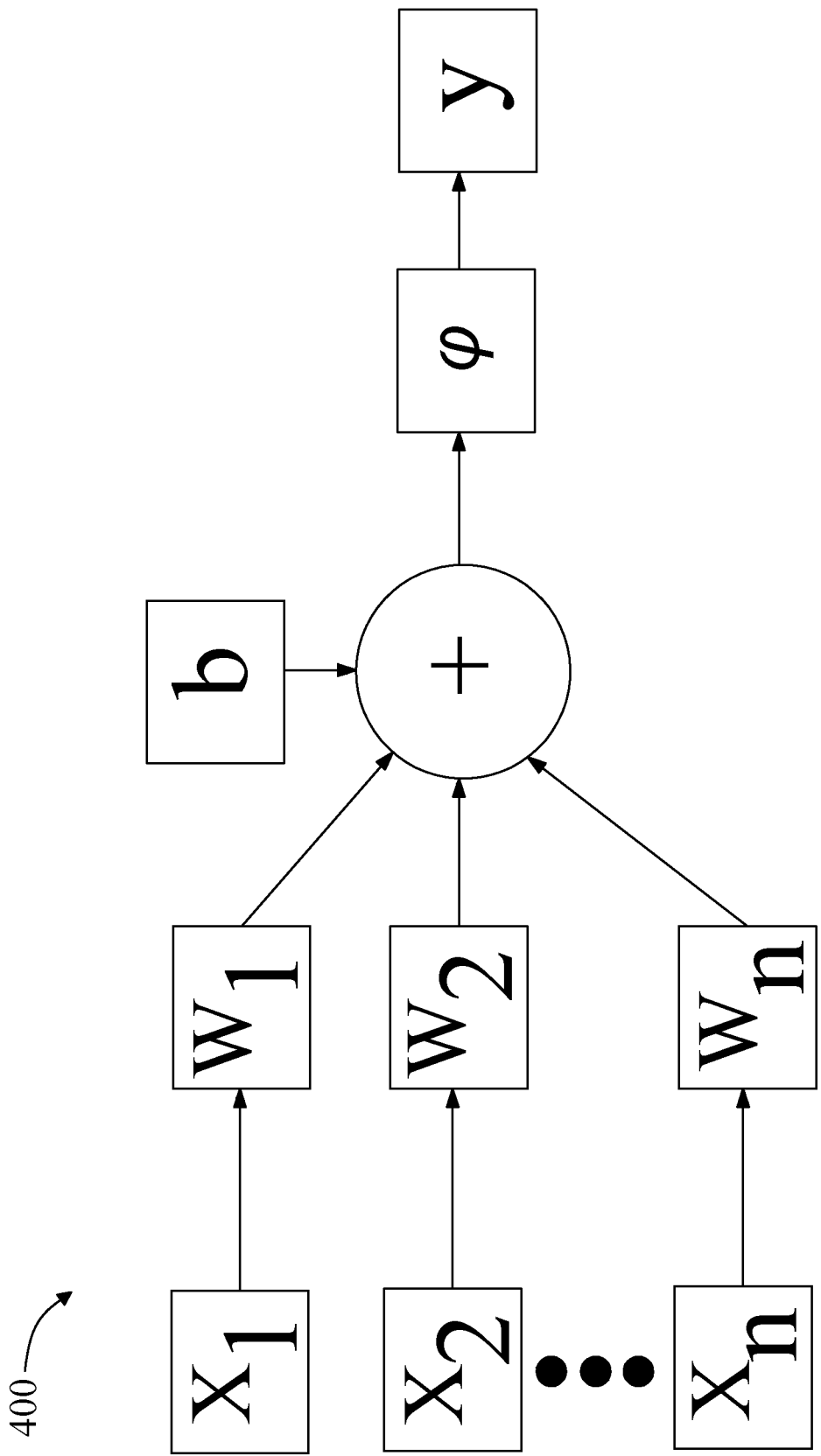
FIG. 4 is a block diagram of an exemplary node.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
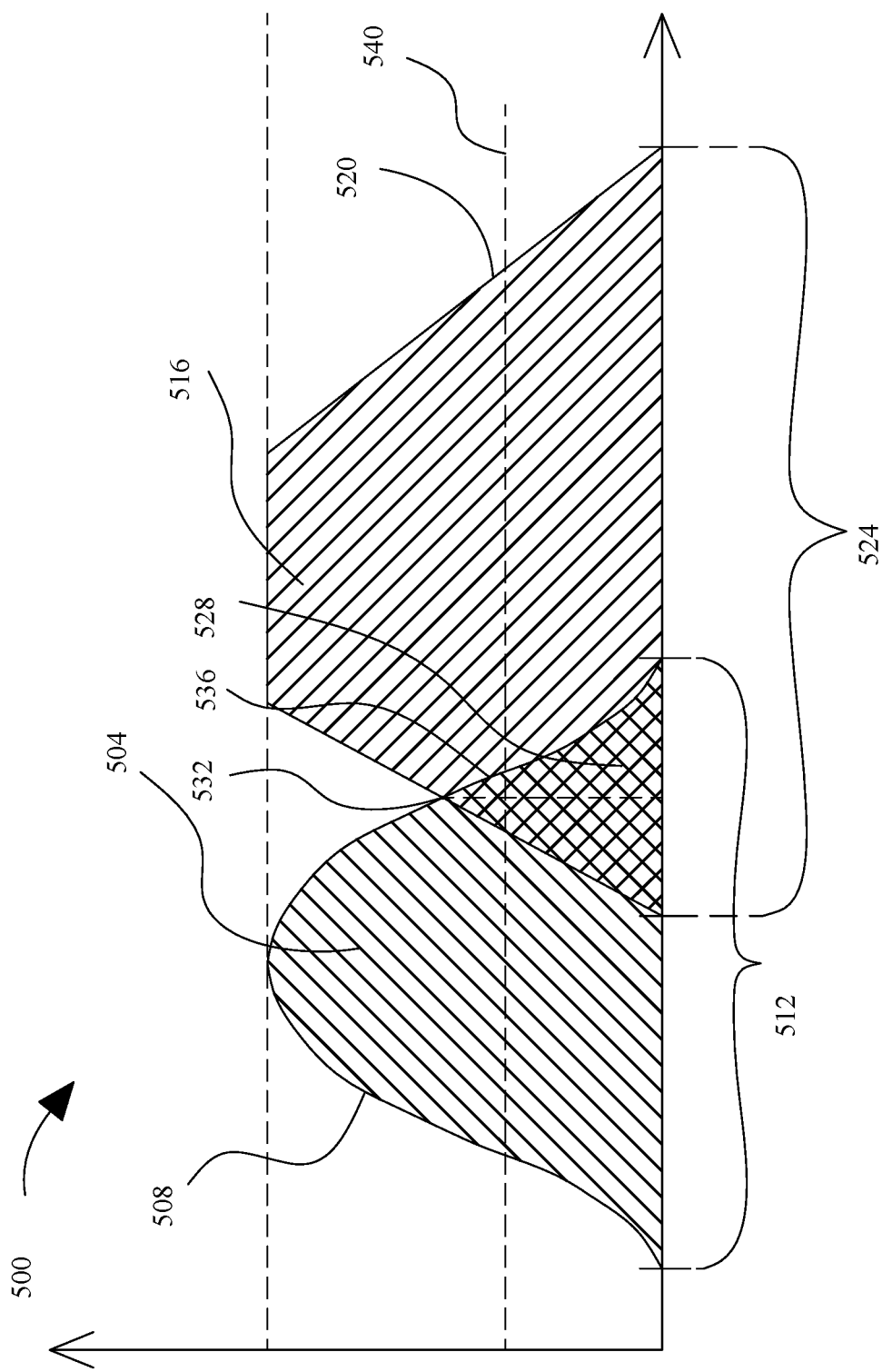
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models such as output datum from classifier 144 containing a matched user identifier. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models such as output datum from classifier 144 containing a matched user identifier, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify a matched user identifier to a superiority criterion. For instance, if a matched user identifier has a fuzzy set matching the superiority criterion fuzzy set by having a degree of overlap exceeding a threshold, processor 104 and/or computing device 112 may classify the matched user identifier as belonging to the superiority criterion. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a matched user identifier may be compared to multiple superiority criterion fuzzy sets. For instance, matched user identifier may be represented by a fuzzy set that is compared to each of the multiple superiority criterion fuzzy sets; and a degree of overlap exceeding a threshold between the matched user identifier fuzzy set and any of the multiple superiority criterion fuzzy sets may cause processor 104 and/or computing device 112 to classify the matched user identifier as belonging to superiority criterion. For instance, in one embodiment there may be two superiority criterion fuzzy sets, representing respectively a first superiority criterion and second superiority criterion. First superiority criterion may have a first fuzzy set; Second superiority criterion may have a second fuzzy set; and matched user identifier may have a matched user identifier fuzzy set. Processor 104 and/or computing device 112, for example, may compare a matched user identifier fuzzy set with each of first superiority criterion fuzzy set and second superiority criterion fuzzy set, as described above, and classify a matched user identifier to either, both, or neither of first superiority criterion or second superiority criterion. Machine-learning methods as described throughout may, in a non-limiting example, generate coefficients used in fuzzy set equations as described above, such as without limitation x, c, and σ of a Gaussian set as described above, as outputs of machine-learning methods. Likewise, matched user identifier may be used indirectly to determine a fuzzy set, as matched user identifier fuzzy set may be derived from outputs of one or more machine-learning models that take the matched user identifier directly or indirectly as inputs.

Still referring to FIG. 5, a processor 104 and/or computing device 112 may use a logic comparison program, such as, but not limited to, a fuzzy logic model to determine a superiority ranking among the plauitry of matched user identifiers. A superiority ranking may include, but is not limited to, amateur, average, knowledgeable, superior, and the like; each such superiority ranking may be represented as a value for a linguistic variable representing superiority ranking, or in other words a fuzzy set as described above that corresponds to a degree of superiority as calculated using any statistical, machine-learning, or other method that may occur to a person skilled in the art upon reviewing the entirety of this disclosure. In other words, a given element of matched user identifier may have a first non-zero value for membership in a first linguistic variable value such as "average" and a second non-zero value for membership in a second linguistic variable value such as "superior". In some embodiments, determining a superiority ranking may include using a linear regression model. A linear regression model may include a machine learning model. A linear regression model may be configured to map data of the fuzzy set comparison, such as matched user identifier fuzzy sets matched to a superiority criterion fuzzy set to one or more superiority rankings. A linear regression model may be trained using [insert training data]. In some embodiments, determining a superiority ranking of matched user identifier may include using a superiority ranking classification model. A superiority ranking classification model may be configured to input collected data and cluster data to a centroid based on, but not limited to, frequency of appearance, linguistic indicators of superiorty, and the like. Centroids may include scores assigned to them such that matched user identifiers may each be assigned a score. In some embodiments, a superiority ranking classification model may include a K-means clustering model. In some embodiments, a superiority ranking classification model may include a particle swarm optimization model. In some embodiments, determining a superiority ranking of matched user identifier may include using a fuzzy inference engine. A fuzzy inference engine may be configured to map one or more matched user identifier data elements using fuzzy logic. In some embodiments, a plurality of entity assessment devices may be arranged by a logic comparison program into superiority ranking arrangements. An "superiority ranking arrangement" as used in this disclosure is any grouping of objects and/or data based on skill level and/or output score. This step may be implemented as described above in FIG. 1. Membership function coefficients and/or constants as described above may be tuned according to classification and/or clustering algorithms. For instance, and without limitation, a clustering algorithm may determine a Gaussian or other distribution of questions about a centroid corresponding to a given superiority level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to input element of matched user identifier, such as a degree of compatibility of an element of matched user identifier to posting data, while a second membership function may indicate a degree of relevance of a subject thereof, or another measurable value pertaining to matched user identifier. Continuing the example, an output linguistic variable may represent, without limitation, a score value. An inference engine may combine rules, such as: "if the compatibility level is 'high' and the relevance level is 'high', the superiority score to the posting data is 'high'—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 6:
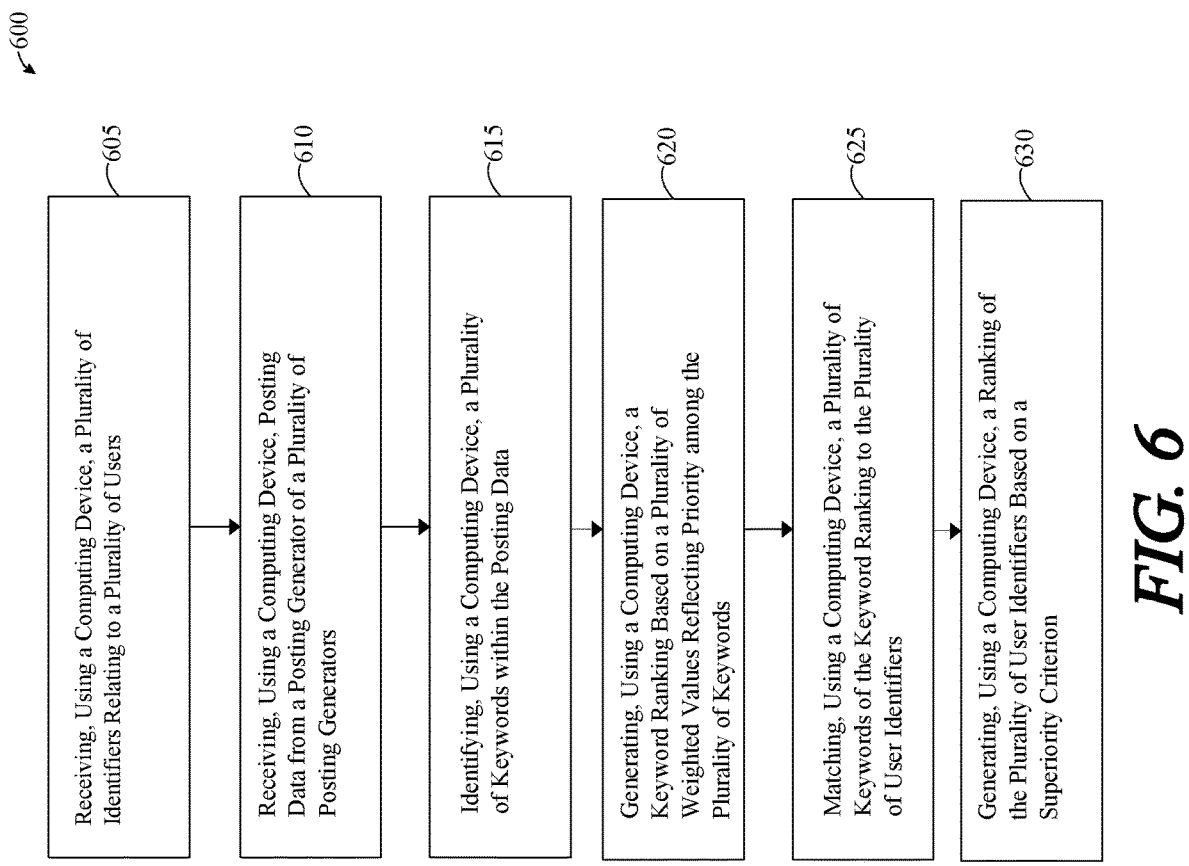
FIG. 6 is a flow diagram of an exemplary method for linking posting data to a plurality of user identifiers.

Referring now to FIG. 6, in an overview of an exemplary method 600 for linking posting data to a plurality of user identifiers. Method 600 includes using a computing device, being any described through this disclosure, for example and with reference to FIGS. 1-6. At step 605, method 600 includes using a computing device configured to receive a plurality of user identifiers relating to a plurality of users, wherein a user identifier of the plurality of user identifiers includes at least a video resume, for example and with reference to FIG. 1. The plurality of user identifiers is received by the computing in a at least a video resume format. The computing device may receive such data through a user database as described in FIG. 1. In some cases, the video resume may include content that is representative or communicative of at least an attribute of the user. Attributes may include information representing a user such as skills, competencies, experience, credentials, talents, and the like. The user may be represented directly by video resume. The video resume may contain content, components, and data, as described in FIG. 1, such as verbal content.

In some cases, the video resume may include a digital video, which may be communicated by way of digital signals, for example between computing devices which are communicatively connected with at least a network. To optimize speed and/or cost of transmission of the video resume. Video may be compressed according to a video compression coding format (i.e., codec). Exemplary video compression codecs include H.26x codecs, MPEG formats, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Still referring to FIG. 6, in some embodiments, an image component may include or otherwise represent audible verbal content related to at least an attribute of a user. As used in this disclosure, "audible verbal content" is oral (e.g., spoken) verbal content. In some cases, audible verbal content may be included within the video resume by way of an audio component. As used in this disclosure, an "audio component" is a representation of audio, for example a sound, a speech, and the like. In some cases, verbal content may be related to at least an attribute of subject. Additionally, or alternatively, visual verbal content and audible verbal content may be used as inputs to classifiers as described throughout this disclosure.

In some cases, the computing device may include audio-visual speech recognition (AVSR) processes to recognize verbal content in the video resume. For example and with reference to FIG. 1, the computing device may use image content to aid in recognition of audible verbal content such as viewing a user move their lips to speak on video to process the audio content of the video resume. AVSR may use an image component to aid the overall translation of the audio verbal content of the video resume. In some embodiments, AVSR may include techniques employing image processing capabilities in lip reading to aid speech recognition processes.

Still referring to FIG. 6, at step 610, method 600 includes using a computing device configured to receive posting data from a posting generator of a plurality of posting generators, for example and with reference to FIG. 1. Posting data may include a plurality of descriptive data elements pertaining to the posting generator. In some embodiments, the posting data may be stored in a database connected to the computing device using any network interface described throughout this disclosure. In some embodiments, the posting data may be stored in a database connected to the computing device using any network interface described throughout this disclosure. The user database and the posting database may be implemented, without limitation, as a relational database, a key-value retrieval database such as a NOSQL database, or any other format or structure for use as a database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 6, at step 615, method 600 includes using a computing device configured to identify a plurality of keywords within the posting data, for example and with reference to FIG. 1. The plurality of keywords may include at least the plurality of descriptive data elements of the posting generator. Varying embodiments and example of the plurality of keywords are reference here as described in FIG. 1. The posting data may be in the form of a document, pdf, HTML, HTM, text file (TXT) and the like. In some cases, the computing device may be configured to recognize at least a keyword in a video resume as a function of visual verbal content. In some cases, recognizing keywords in the posting data may include a language processing module, for example and with reference to FIG. 1. A language processing module may include any hardware and/or software module. In some cases, recognizing keywords in the posting data and video resume may include using optical character recognition, for example and with reference to FIG. 1.

At step 620, method 600 includes using a computing device configured to generate a keyword ranking of posting data based on a plurality of weighted values reflecting priority among the plurality of keywords, for example and with reference to FIG. 1. Priority may be based on the job fulfillment needs of the posting generator. For example, keywords related to education requirements many given a higher weighted value than keywords related to hobbies. Generating ranking may include using a machine learning process, as described in FIGS. 1-5, including a feedback loop to generate the plurality of weighted values based on training data containing at least priority feedback from the plurality of posting generators. This may allow the machine learning system to adjust weighted values for optimized ranking output in the future. In some embodiments, priority feedback may be contained in a priority feedback database, as any described throughout this disclosure, that a plurality of posting generators can upload positive or negative samples to. In some embodiments, the at least priority feedback from the plurality of posting generators is received from a priority feedback database containing a plurality of samples related to the keyword ranking. This feedback process may be used by training the machine learning system to learn keyword priority patterns among a plurality of posting generators when determining weighted values.

At step 625, method 600 includes using a computing device configured to match a plurality of keywords of the keyword ranking to the plurality of user identifiers, for example and with reference to FIG. 1. In some embodiments, matching may include classifying the keywords containing in posting data to similar keywords contained in video resume. Matching may occur through a classifier as described in FIGS. 1-5. In an embodiment, classifier training data may include the user database, the posting data database, samples, and examples of keywords a language processing module, and any other training data described throughout this disclosure. The classifier may take the plurality of ranked keywords from posting data and the plurality of user identifiers contained in the user database as algorithm inputs. The classifier may then use the training data disclosed above to output data bins of particular user identifiers of the plurality of user identifiers matched to the posting data, for example and with reference to FIG. 1. Each data bin may be labeled with the contact information of the user. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6, at step 630, method 600 includes using a computing device configured to generate, as a function of the matching, a ranking of the plurality of user identifiers based on a superiority criterion using a fuzzy set inference system. In some embodiments, ranking may be based on the superiority of each user identifier, regarding compatibility to the posting data, compared to the plurality of user identifiers. Ranking of the plurality of user identifiers includes using a fuzzy set inference system as discussed in FIG. 5. The computing device may take the output data of classifier and use it as fuzzy set input where in the inference system may utilize a superiority criterion to rank each matched user identifier against that the plurality of matched user identifiers. In some embodiments, as a function of the user identifier ranking, the computing device may be configured to send the inference system output to a computing device operated by the posting generator associated with the posting data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
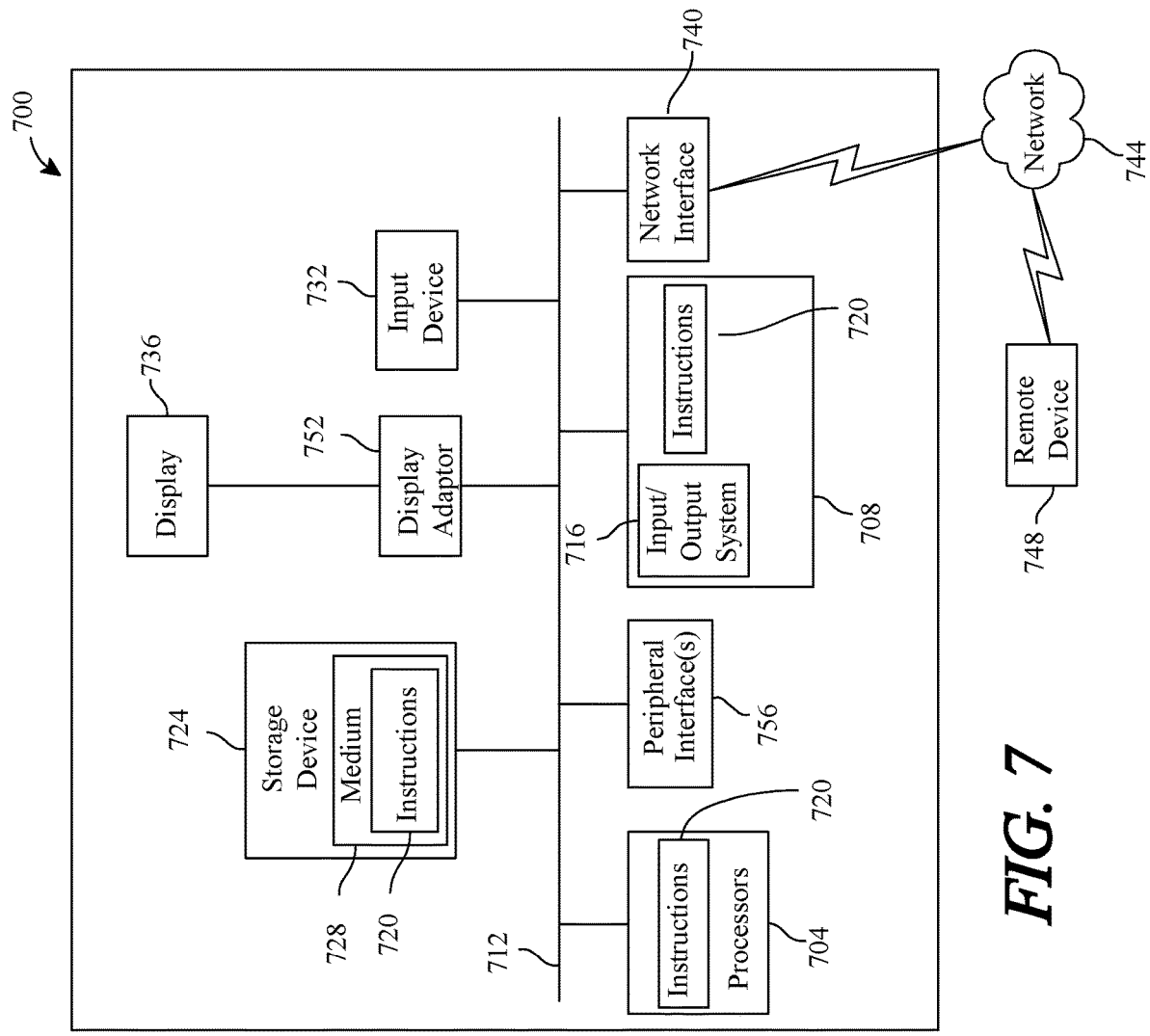
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for linking posting data to a plurality of user identifiers, the apparatus comprising:
at least a processor; and
a memory communicatively connected to the processor, the memory containing instructions configuring the at least a processor to:
receive a plurality of user identifiers relating to a plurality of users, wherein a user identifier of the plurality of user identifiers comprises at least a video resume;
receive posting data from a posting generator of a plurality of posting generators;
identify a plurality of keywords within the posting data;
generate a keyword ranking, wherein generating a keyword list ranking comprises generating, by the at least a processor, a plurality of weighted values as a function of training data containing at least priority feedback from the plurality of posting generators as a function of a machine learning process containing a feedback loop, wherein the plurality of weighted values reflect priority among the plurality of keywords;
match a plurality of keywords of the keyword ranking to the plurality of user identifiers; and
generate, as a function of the matching, a ranking of the plurality of user identifiers based on a superiority criterion of each user identifier using a fuzzy set inference system.

2. The apparatus of claim 1, wherein:
the at least video resume contains at least verbal content; and
the memory contains instructions further configuring the processor to utilize at least an audiovisual speech recognition process to convert the verbal content into textual data.

3. The apparatus of claim 1, wherein the posting data comprises a plurality of descriptive data elements pertaining to the posting generator.

4. The apparatus of claim 1, wherein the plurality of keywords comprises at least the plurality of descriptive data elements.

5. The apparatus of claim 1, wherein the memory contains instructions further configuring the processor to use a language processing module to extract the plurality of keywords from the posting data.

6. The apparatus of claim 1, wherein the memory contains instructions further configuring the processor to use optical character recognition to extract the plurality of keywords from the posting data.

7. The apparatus of claim 1, wherein the at least priority feedback from the plurality of posting generators is received from a priority feedback database containing a plurality of samples related to the keyword ranking.

8. The apparatus of claim 1, wherein matching a plurality of keywords to the plurality of user identifiers comprises using a machine learning classification algorithm configured to output data bins of a plurality of particular user identifiers matched to the posting data.

9. The apparatus of claim 8, wherein using the machine learning classification algorithm further comprises using a language processing module.

10. A method for using linking posting data to a plurality of user identifiers, the method comprising:

receiving, using a computing device, a plurality of identifiers relating to a plurality of users, wherein a user identifier of the plurality of user identifiers comprises at least a video resume;

receiving, using a computing device, posting data from a posting generator of a plurality of posting generators;

identifying, using a computing device, a plurality of keywords within the received posting data;

generating, using a computing device, a keyword ranking, wherein generating a keyword list ranking comprises generating, by the at least a processor, a plurality of weighted values as a function of training data containing at least priority feedback from the plurality of posting generators as a function of a machine learning process containing a feedback loop, wherein the plurality of weighted values reflect a priority among the plurality of keywords;

matching, using a computing device, a plurality of keywords of the keyword ranking to the plurality of user identifiers; and generating, using a computing device, a ranking of the plurality of user identifiers based on a superiority criterion of each user identifier using a fuzzy set inference system.

11. The method of claim 10, wherein:
the at least video resume contains at least verbal content; and the method further comprises using at least an audiovisual speech recognition process to convert the verbal content into textual data.

12. The method of claim 10, wherein the posting data comprises a plurality of descriptive data elements pertaining to the posting generator.

13. The method of claim 10, wherein the plurality of keywords comprises at least the plurality of descriptive data elements.

14. The method of claim 10, wherein the method further comprises using language processing module to extract a plurality of keywords from the received posting data.

15. The apparatus of claim 10, wherein the method includes using optical character recognition to extract the plurality of keywords from the posting data.

16. The apparatus of claim 10, wherein the at least priority feedback from the plurality of posting generators is received from a priority feedback database containing a plurality of samples related to the keyword ranking.

17. The method of claim 10, wherein matching a plurality of keywords to the plurality of user identifiers comprises using a machine learning classification algorithm configured to output data bins of a plurality of particular user identifiers matched to the posting data.

18. The method of claim 17, wherein using the machine learning classification algorithm further comprises using a language processing module.

* * * * *